United States Patent [19]

Akita et al.

[11] Patent Number: 4,929,679

[45] Date of Patent: May 29, 1990

[54] RUBBER COMPOSITION FOR TIRE TREAD

[75] Inventors: Shuichi Akita; Fumitoshi Suzuki, both of Yokohama; Yasushi Kikuchi, Odawara; Hideyuki Oishi, Hiratsuka, all of Japan

[73] Assignees: Nippon Zeon Co., Ltd.; The Yokohama Rubber Co., Ltd., both of Tokyo, Japan

[21] Appl. No.: 327,457

[22] Filed: Mar. 22, 1989

[30] Foreign Application Priority Data

Apr. 2, 1988 [JP] Japan .................................. 63-80253

[51] Int. Cl.$^5$ ........................... C08L 7/00; C08L 9/00; C08L 9/06
[52] U.S. Cl. .................. 525/194; 152/209 R; 525/196; 525/237
[58] Field of Search ............... 525/237, 194, 233, 196; 152/209 R

[56] References Cited

U.S. PATENT DOCUMENTS

| | | | |
|---|---|---|---|
| 4,721,719 | 1/1988 | Odar et al. | 525/237 |
| 4,748,168 | 5/1988 | Kawakami et al. | 525/237 |
| 4,822,844 | 4/1989 | Kawakami et al. | 525/237 |
| 4,824,900 | 4/1989 | Sakurai | 525/237 |

*Primary Examiner*—Allan M. Lieberman
*Attorney, Agent, or Firm*—Armstrong, Nikaido, Marmelstein, Kubovcik & Murray

[57] ABSTRACT

A rubber composition for tire tread, comprising a rubber mixture composed of two kinds of styrene-butadiene copolymer rubber different from each other in the styrene content and the vinyl bond content in butadiene, polybutadiene rubber, natural rubber and/or synthetic polyisoprene rubber.

4 Claims, No Drawings

RUBBER COMPOSITION FOR TIRE TREAD

BACKGROUND OF THE INVENTION

The present invention relates to a rubber composition, comprising two kinds of styrene-butadiene copolymer rubber different from each other in their styrene content and the vinyl bond content in their butadiene units polybutadiene rubber, natural rubber and/or synthetic polyisoprene rubber, and more particularly, to a rubber composition for tire tread having excellent abrasion resistance, wet skid resistance, and rolling resistance.

Rubber compositions capable of reducing rolling resistance have been proposed in the art from the viewpoint of fuel saving (e.g., U.S. Pat. Nos. 4,334,567, 4,485,205). Since these rubber compositions are each mainly composed of so-called "high-vinyl styrene-butadiene copolymer rubber" having a relatively high vinyl bond content (hereinafter referred to as "HV-SBR"), the use thereof for tire tread had the disadvantage of poor abrasion resistance although it offered a relatively good balance between rolling resistance and wet skid resistance with respect to gripping performance on a wet road surface.

In order to eliminate the disadvantage of poor abrasion resistance, e.g., Japanese Patent Laid-Open Nos. 70134/1982, 87441/1982, and 21435/1983 each propose a method wherein use is made of a combination of HV-SBR with natural rubber and polybutadiene rubber having a low vinyl bond content. However, these methods had a disadvantage that the wet skid resistance was inevitably lowered to some extent. Further, insufficient wet skid resistance could be attained by the method disclosed in Japanese Patent Laid-Open No. 87443/1982 wherein use is made of a combination of HV-SBR with styrene-butadiene copolymer rubber having a low vinyl bond content, natural rubber and/or polybutadiene rubber having a low vinyl bond content.

A rubber composition disclosed in Japanese Patent Laid-Open No. 207342/1987 comprising styrene-butadiene copolymer having a high styrene content and a low vinyl bond content can offset the above-described disadvantage to some extent. However, the effect is not yet satisfactory.

SUMMARY OF THE INVENTION

The present invention has been made in order to overcome the above-described disadvantages. Accordingly, an object of the present invention is to provide a rubber composition for tire tread having excellent abrasion resistance, wet skid resistance, and rolling resistance.

The prevent inventors have made extensive and intensive studies with a view to eliminating the above-described disadvantages and, as a result, have found that the use of raw rubber comprising HV-SBR, natural rubber and/or synthetic polyisoprene rubber and polybutadiene rubber having a low vinyl bond content in combination with styrene-butadiene copolymer rubber having a medium vinyl bond content and a high styrene content brings about the formation of a composition having a balance among abrasion resistance, wet skid resistance, and rolling resistance improved to a large extent, utterly unexpected, from the conventional rubber composition. This finding has led to the completion of the present invention.

Accordingly, the present invention provides a rubber composition for tire tread comprising a rubber mixture composed of:

(a) 5 to 30% by weight of styrene-butadiene copolymer rubber having 35 to 60% by weight of bound styrene and 35 to 60% by mole of vinyl bond in butadiene unit and prepared by solution polymerization in the presence of an organic lithium compound (hereinafter referred to as "SBR-A");

(b) 15 to 40% by weight of styrenebutadiene copolymer rubber having 5 to 20% by weight of bound styrene and 50 to 90% by mole of vinyl bond content in butadiene unit and prepared by solution polymerization in the presence of an organic lithium compound (hereinafter referred to as "SBR-B");

(c) 5 to 30% by weight of polybutadiene rubber having 20% by mole or less of vinyl bond (hereinafter referred to as "BR"); and (d) 10 to 60% by weight of natural rubber and/or synthetic polyisoprene rubber having 90% by mole or more of cis-1,4 bond.

DETAILED DESCRIPTION OF THE PREFERRED EMBODIMENTS (1) In the present invention, the rubber mixture constituting the rubber composition for tire tread comprises SBR-A, SBR-B, BR, and natural rubber and/or synthetic polyisoprene rubber.

(a) SBR-A:

SBR-A used in the present invention is a styrene-butadiene copolymer rubber having 35 to 60% by weight of bound styrene and 35 to 60% by mole of vinyl bond in butadiene unit and prepared by solution polymerization in the presence of an organic lithium compound as a polymerization initiator.

When the content of bound styrene and the vinyl bond are respectively outside the above-described ranges, the wet skid resistance of the rubber composition for tire tread is unfavorably lowered.

SBR-A is used in an amount of 5 to 30% by weight based on the rubber mixture. When the amount is less than 5% by weight, the wet skid resistance is lowered. On the other hand, when the amount exceeds 30% by weight, the rebound resilience as determined at 50° to 70° C. is lowered, which unfavorably brings about an increase in the rolling resistance as the tire performance.

(b) SBR-B:

SBR-B used in the present invention is styrene-butadiene copolymer rubber having 5 to 20% by weight of bound styrene and 50 to 90% by mole of vinyl bond in butadiene unit and prepared by solution polymerization in the presence of an organic lithium compound as a polymerization initiator.

When the bound styrene content is less than 5% by weight, the abrasion resistance and tensile resistance of the composition for tire tread is unfavorably lowered, while when the bound styrene content exceeds 20% by weight, the abrasion resistance is unfavorably lowered. When the vinyl bond content is less than 50% by mole, the wet skid resistance is lowered, while when the vinyl bond content exceeds 90% by mole, the abrasion resistance is lowered. The content of bound styrene and the vinyl bond are preferably 10 to 20% by weight and 60 to 80% by mole, respectively.

SBR-B is used in an amount of 15 to 40% by weight based on the rubber mixture. When the amount is less than 15% by weight, the wet skid resistance is unfavorably lowered, while when the amount exceeds 40% by weight, the abrasion resistance is unfavorably lowered.

(c) BR:

BR used in the present invention is polybutadiene rubber having 20% by mole or less of vinyl bond.

When the vinyl bond content exceeds 20% by mole, the abrasion resistance of the rubber composition for tire tread is unfavorably lowered.

BR is used in an amount of 5 to 30% by weight based on the rubber mixture. When the amount is less than 5% by weight, the abrasion resistance is lowered, while when the amount exceeds 30% by weight, the wet skid resistance is lowered.

Specific examples of BR include, besides polybutadiene rubber prepared by solution polymerization in the presence of an organic lithium compound as a polymerization initiator, polybutadiene rubber prepared by making use of a Ziegler catalyst, and polybutadiene rubber prepared by emulsion polymerization.

(d) Natural rubber and polyisoprene rubber:

In the present invention, natural rubber and/or synthetic polyisoprene rubber having a cis-1,4 bond content of 90% by mole or more are used as a blend component.

Although natural rubber and synthetic polyisoprene rubber may be mixed with each other in any proportion, they are used in an amount of 10 to 60% by weight in total based on the rubber mixture. When the amount is less than 10% by weight, the processability and the rebound resilience as determined at 50° to 70° C. are unfavorably lowered, while when the amount exceeds 60% by weight, the wet skid resistance is unfavorably lowered. The amount of the natural rubber and/or synthetic polyisoprene rubber is preferably 20 to 60% by weight.

(2) Properties of SBR-A, SBR-B, and BR:

It is preferred from the viewpoint of rolling resistance that SBR-A and SBR-B used in the present invention each have a random styrene sequence distribution. With respect to the measure of the randomness, it is preferred that an amount of the long-chain block styrene sequence, as determined according to the ozone decomposition - gel permeation chromatography (GPC) described in Polymer, 22, 1721 (1981), be less than 5% by weight, based on the whole bound styrene.

It is preferred that SBR-A, SBR-B, and BR each have a Mooney viscosity of 20 to 200 and a weight-average molecular weight of 100000 to 1000000 in terms of polystyrene standard as determined by GPC. When the Mooney viscosity is less than 20 or the weight-average molecular weight is less than 100000, not only the rebound resilience as determined at 50° to 70° C. but also the tensile strength of the rubber composition for tire tread is unfavorably lowered. On the other hand, when the Mooney viscosity exceeds 200 or the weight average molecular weight exceeds 1000000, the processability is lowered, which unfavorably brings about a lowering in the tensile strength and the abrasion resistance.

(3) In the present invention, the lithium terminal of at least one polymer or copolymer selected from among the above-described SBR-A, SBR-B, and BR and prepared by making use of an organic lithium compound (these polymers or copolymers each are hereinafter referred to as "diene rubber") may be reacted with at least one compound selected from among compounds having a structure represented by the formula

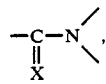

wherein X is an oxygen atom or, a sulfur atom, benzophenones, and thiobenzophenones to prepare a polymer or a copolymer, and the polymer or copolymer thus prepared may be compounded with SBR-A, SBR-B, and BR so that the amount of the polymer or copolymer is at least 20% by weight, preferably at least 30% by weight, more preferably 40% to 100% by weight based on the total amount of SBR-A, SBR-B, and BR.

Specific examples of compounds having a structure represented by the formula <include: N,N-dimethylformamide, N,N-diethylformamide, N,N-diethylacetamide, aminoacetamide, N,N-dimethyl-N'N'-dimethylaminoacetamide, N-phenyldiacetamide, N,N-dimethylacrylamide, N,N-dimethylmethacrylamide, propionamide, N,N-dimethylpropionamide, 4-pyridylamide, N,N-dimethyl-4-pyridylamide, N,N-dimethylbenzamide, p-aminobenzamide, N',N'-(p-dimethylamino)benzamide, N,N-dimethyl-N'-(p-ethylamino)benzamide, N-acetyl-N-2-naphthylbenzamide, nicotinamide, N,N-diethylnicotinamide, succinamide, maleimide, N,N,N',N'-tetramethylmaleimide, succinimide, maleimide, N-methylmaleimide, N-methylphthalimide, 1,2-cyclohexanedicarboximide, N-methyl-1,2-cyclohexanedicarboximide, oxamide, 2-furamide, N,N,N',N'-tetramethyloxamide, N,N-dimethyl2-furamide, N,N-dimethyl-8-quinolinecarboxamide, N,N-dimethyl-p-aminobenzalacetamide, N,N-dimethyl-N'N'-(p'-dimethylamino)cinnamylideneacetamide, N,N-dimethyl-N',N'-(2-dimethylamino)vinylamide, N'-(2-methylamino)-vinylamide, urea, N,N'-dimethylurea, N,N,N',N'-tetramethylurea, methyl carbamate, ethyl N,N-diethylcarbamate, ε-caprolactam, N-methyl-ε-caprolactam, N-acetyl-ε-caprolactam, 2-pyrrolidone, N-methyl-2-pyrrolidone, N-acetyl-2-pyrrolidone, N-vinylpyrrolidone, 2-piperidone, N-methyl-2-piperidone, 2-quinolone, N-methyl-2-quinolone, 2-indolinone, N-methyl-2-indolinone, isocyanuric acid, N,N',N''-trimethylisocyanuric acid, 1,3-diethyl-2-imidazolidinone, 1,3-dimethyl-2-imidazolidinone, 1,3-dipropyl-2-imidazolidinone, 1-methyl-3-ethyl-2-imidazolidinone, 1-methyl-3-propyl2-imidazolidinone, 1-methyl-3-butyl-2-imidazolidinone, 1-methyl-3-(2-methoxyethyl)-2-imidazolidinone, 1-methyl3-(2-ethoxyethyl)-2-imidazolidinone, 1,3-di-(2-ethoxyethyl)-2-imidazolidinone, 1,3-dimethylethylenethiourea, 1,3-dimethyl-3,4,5,6-tetrahydro-2(1H)-pyrimidinone, and sulfur analogs thereof. Among these compounds, those having an alkyl group bonded to a nitrogen atom are particularly preferable.

Examples of the benzophenones and thiobenzophenones include those containing an amino group or a substituted amino group. Specific examples thereof include 4-aminobenzophenone, 4-dimethylaminobenzophenone, 4-dimethylamino-4'-methylbenzophenone, 4,4'-diaminobenzophenone, 4,4'-bis(dimethylamino)-benzophenone, 4,4'-bis(diethylamino)benzophenone, 4,4'-bis(ethylamino)benzophenone, 3,3'-dimethyl-4,4'-bis(diethylamino)benzophenone, 3,3'-dimethoxy-4,4'-bis(dimethylamino)benzophenone, 3,3',5,5'-tetraaminobenzophenone, 2,4,6-triaminobenzophenone, 3,3',5,5'-tetra(diethylamino)benzophenone, and thiobenzophenones corresponding to these compounds. The substituted amino group is preferably one having an alkyl group, particularly preferably a dialkyl-substituted amino group. Substituents other than the amino group and substituted amino group may be present as far as they exert no adverse effect on the reaction.

The rolling resistance (rebound resilience at 50° to 70° C.) can be improved without detriment to the wet skid resistance by reacting at least one compound selected from the above-described compounds having a structure represented by the formula

<, benzophenones, and thiobenzophenone the lithium terminal of the above-described diene rubber to introduce a functional group into the diene rubber. The polymer or copolymer combined with the abovedescribed compound is compounded in an amount of at least 20% by weight, preferably at least 30% by weight, more preferably 40–100% by weight based on the total amount of SBR-A, SBR-B, and BR. When the amount is less than 20% by weight, little or no effect can be attained with respect to an improvement in the rolling resistance.

The reaction of the diene rubber having a lithium terminal with the above-described organic compounds is conducted according to the method disclosed in Japanese Patent Laid-Open No. 137913/1985 and Japanese Patent Publication No. 362/1986, i.e., by adding the organic compound to a solution of a polymer or copolymer in a living state and stirring the mixture. The organic compound is usually used in a molar amount equal to or larger than that of the lithium atom contained in the living polymer or copolymer.

(4) In the present invention, a polymer or a copolymer comprising at least one member selected from among the above-described SBR-A, SBR-B, and BR and prepared by making use of an organic lithium compound, i.e., the diene rubber, may be coupled with at least one metal selected from among tin, silicon, lead, and germanium, and the polymer or copolymer may be then compounded with SBR-A, SBR-B, and BR so that the amount of the polymer or copolymer is at least 20% by weight, preferably at least 30%, by weight or, more preferably, 40 to 100% by weight, based on the total amount of SBR-A, SBR-B, and BR.

The polymer or copolymer containing the above-described metal coupling can be prepared by reacting a halide of the above-described metal with the lithium terminal of the diene rubber in a living state. However, it is to be noted that BR used in the present invention to which this reaction can be applied is limited to one prepared by making use of an organic lithium compound as a polymerization initiator.

The metal halide functions as a coupling agent and reacts with the lithium terminal of the diene rubber to provide a branched polymer wherein the metal atom functions as a branching point, thereby preventing the occurrence of so-called "cold flow", i.e., a phenomenon wherein the diene rubber spreads out during storage to bring about deformation. The branched diene rubber is compounded in an amount of at least 20% by weight based on the total amount of SBR-A, SBR-B, and BR. When the amount is less than 20% by weight, no satisfactory effect can be attained with respect to the prevention of the above-described cold flow.

Among the above-described metal halides, tin halide is particularly preferred because the rolling resistance can be improved without detriment to the wet skid resistance.

(5) In the present invention, if necessary, to the rubber mixture comprising SBR-A, SBR-B, BR and natural rubber and/or synthetic polyisoprene rubber may be added compounding ingredients commonly employed in the rubber industry, such as carbon black, process oils, reinforcing agents, fillers, antioxidants, softeners, plasticizers, vulcanizing agents, vulcanization accelerators, and vulcanization assistants.

At least one raw rubber used in the present invention may be oil extended before use.

The rubber composition for tire tread thus prepared can be easily molded into a tire tread according to a customary method.

The present invention will now be described in more detail with reference to the following Examples and Comparative Examples. However, the present invention is not limited to these Examples only.

Examples and Comparative Examples
Production of diene rubber
Examples of production of SBR-A, SBR-B, and BR will now be described.

A stainless steel reactor having an internal volume of 10 l was washed and dried, and the internal air was substituted with dry nitrogen. Thereafter, the reactor was charged with 4500 g of cyclohexane and styrene, butadiene and N,N,N',N'-tetramethylethylenediamine respectively in amounts shown in Table 1. n-Butyllithium was added thereto in an amount shown in Table 1 while maintaining the temperature within the reactor at 45° C. 10 min after the initiation of the polymerization, the temperature of the reactor was raised with hot water flowing through a jacket and finally raised to 60° C. Further, from upon the initiation of the reaction, butadiene and/or styrene were continuously added to the reactor respectively in amounts shown in Table 1. After confirming that the conversion reached 100%, 5 ml of methanol was added to stop the reaction when neither coupling agent nor functional group was introduced. Thereafter, 8 g of 2,6-di-tert-butyl-p-cresol (BHT) was added, and steam was blown into the resultant polymer solution to remove the solvent. The polymer thus prepared was passed through between rolls for dehydration and then dried in vacuo at 60° C. for 24 hr. When coupling was to be conducted, tin tetrachloride was added in a molar amount of ¼ of the terminal prior to addition of methanol, and the mixture was allowed to react with each other for 30 min. After the completion of the reaction, 5 ml of methanol was added to stop the reaction. Thereafter, 8g of BHT was added, and steam was blown into the resultant polymer solution to remove the solvent. The polymer thus prepared was passed through between rolls for dehydration and then dried in vacuo at 60° C. for 24 hr. When a functional group was to be introduced, the compound shown in Table 2 was added in a molar amount equal to that of the terminal prior to addition of methanol whether or not the coupling was conducted, and the mixture was allowed to react with reach other for 30 min. After the completion of the reaction, 5 ml of methanol was added to stop the reaction. Thereafter, 8 g of BHT was added, and steam was blown into the resultant polymer solution to remove the solvent. The polymer thus prepared was passed through between rolls for dehydration and then dried in vacuo at 60° C. for 24 hr, thereby preparing polymers and copolymers shown in Table 2.

(Co)polymer A-1 or C-4 shown in Table 2 and natural rubber were compounded with each other according to the recipe shown in Table 3. Specifically, raw rubber and compounding agents exclusive of a vulcanizing agent and sulfur were mixed in a 0.25-l Banbury mixer for 4 min. A vulcanizing agent and sulfur were added to the mixture and kneaded in a 6-in. laboratory mixing mill for 4 min to prepare a rubber composition. The rubber composition was press vulcanized at 160° C. to prepare an intended specimen. The specimen was subjected to various tests to measure the physical properties. The raw rubber composition, press vulcanization time and results of measurements of the physical properties are shown in Tables 4 and 5.

Analytical and test methods

The analysis and the test for the evaluation of the physical properties were conducted by the following methods.

Styrene content and vinyl bond content

The bound styrene content and vinyl bond content were determined according to Hampton's method [Anal Chem., 21, (1949)] and $^1$H-NMR in the case of polybutadiene rubber.

Proportion of branched (co)polymer

The proportion of branched (co)polymer was calculated from the area ratio by GPC (HLC-802 manufactured by Tosoh Corporation; column: G4000H6+G5000H6; solvent: tetrahydrofuran.

Abrasion resistance

The abrasion resistance was measured according to ASTM D2228 by making use of a Pico abrasion machine and expressed in terms of an index determined by the following equation (amount of abrasion in Comparative Example 5)×100/(amount of abrasion of sample). The larger the value, the better the abrasion resistance.

Wet skid resistance

The road surface of Safety Walk manufactured by 3M Ltd. was wet with distilled water, and the wet skid resistance was measured with a portable skid tester manufactured by Stanley, U.K., and expressed in terms of an index supposing the wet skid resistance of Comparative Example 5 to be 100. The larger the value, the better the wet skid resistance.

Rebound resilience at 60° C.

The rebound resilience was quickly measured with respect to a specimen heated in an atmosphere of 60° C. for 1 hr or longer with a Lupke resilience tester, and the maximum value among four measurements was recorded.

Tensile test

The tensile test was conducted according to JIS K-6301.

Evaluation of measurements

It is apparent that Examples 1 to 8 shown in Table 4 are superior to Comparative Examples 1 to 6 in the balance among abrasion resistance, wet skid resistance, and rebound resilience at 60° C.

Comparative Examples 7 to 11 shown in Table 5 are outside the scope of the present invention with respect to the percentage compositions of SBR-A, SBR-B and BR, and poor in at least one of the abrasion resistance, wet skid resistance, and rebound resilience at 60° C. Similarly, Comparative Examples 12 to 19 wherein the styrene content or vinyl content of at least one of SBR-A, SBR-B and BR are outside the range as described in the claims are poor in at least one of the three above-described physical properties.

Thus, it is apparent that the present invention enables the formation of a rubber composition having an excellent balance among the abrasion resistance, wet skid resistance, and rebound resilience at 60° C. which could not be attained by the conventional rubber composition.

TABLE 1

| polymer | styrene (g) | butadiene (g) | tetramethyl-ethylenediamine (g) | n-butyllithium (g) | post addition (g/g) styrene/butadiene |
|---|---|---|---|---|---|
| A-1 | 335 | 225 | 0.22 | 0.23 | 25/215 |
| A-2 | 335 | 225 | 0.24 | 0.25 | 25/215 |
| A-3 | 335 | 225 | 0.20 | 0.20 | 25/215 |
| A-4 | 335 | 225 | 0.22 | 0.25 | 25/215 |
| A-5 | 335 | 225 | 0.31 | 0.32 | 25/215 |
| A-6 | 335 | 225 | 0.30 | 0.35 | 25/215 |
| A-7 | 450 | 190 | 0.24 | 0.22 | 70/90 |
| A-8 | 240 | 240 | 0.25 | 0.24 | 0/320 |
| A-9 | 335 | 225 | 0.17 | 0.23 | 25/215 |
| A-10 | 335 | 225 | 1.86 | 0.25 | 25/215 |
| B-1 | 65 | 415 | 0.75 | 0.23 | 40/280 |
| B-2 | 65 | 415 | 1.10 | 0.32 | 40/280 |
| B-3 | 120 | 360 | 0.78 | 0.22 | 80/240 |
| B-4 | 0 | 800 | 0.80 | 0.25 | 0/0 |
| B-5 | 105 | 375 | 0.24 | 0.22 | 0/320 |
| C-1 | 0 | 800 | 0 | 0.23 | 0/0 |
| C-2 | 0 | 800 | 0 | 0.33 | 0/0 |
| C-4 | 0 | 800 | 0.07 | 0.21 | 0/0 |

TABLE 2

| polymer | styrene content (wt %) | vinyl content (mol %) | terminal reaction | reagant used in terminal reaction | percentage branched polymer (%) | Mooney viscosity |
|---|---|---|---|---|---|---|
| A-1 | 45 | 44 | omitted | — | 0 | 54 |
| A-2 | 45 | 44 | conducted | a | 0 | 55 |
| A-3 | 44 | 45 | conducted | b | 0 | 57 |
| A-4 | 46 | 45 | conducted | c | 0 | 53 |
| A-5 | 45 | 45 | omitted | — | 48 | 60 |
| A-6 | 45 | 45 | conducted | b | 50 | 61 |
| A-7 | 65 | 45 | omitted | — | 0 | 53 |
| A-8 | 30 | 46 | omitted | — | 0 | 56 |
| A-9 | 45 | 30 | omitted | — | 0 | 52 |
| A-10 | 45 | 65 | omitted | — | 0 | 55 |
| B-1 | 13 | 70 | omitted | — | 0 | 59 |
| B-2 | 13 | 70 | conducted | b | 46 | 56 |
| B-3 | 25 | 70 | omitted | — | 0 | 56 |
| B-4 | 0 | 70 | omitted | — | 0 | 57 |
| B-5 | 13 | 45 | omitted | — | 0 | 58 |
| C-1 | 0 | 11 | omitted | — | 0 | 59 |
| C-2 | 0 | 11 | conducted | b | 51 | 50 |

TABLE 2-continued

| polymer | styrene content (wt %) | vinyl content (mol %) | terminal reaction | reagant used in terminal reaction | percentage branched polymer (%) | Mooney viscosity |
|---|---|---|---|---|---|---|
| C-3 | 0 | 1 | omitted | — | — | 43 |
| C-4 | 0 | 26 | omitted | — | 0 | 52 |

Note:
a: N-methyl-ε-caprolactam
b: 1,3-dimethyl-2-imidazolidinone
c: 4,4'-bis(diethylamino)benzophenone
c-3 is Nipol BR-1220 which is a product of Nippon Zeon Co., Ltd.

TABLE 3

| | |
|---|---|
| raw rubber | 100 parts by weight |
| HAF carbon black*1 | 60 parts by weight |
| aromatic oil | 20 parts by weight |
| zinc oxide | 3 parts by weight |
| stearic acid | 1.5 parts by weight |
| sulfur | 1.75 parts by weight |
| vulcanization accelerator*2 | 1.2 parts by weight |

Note:
*1 Seast KH; a product of Tokai Carbon Co., Ltd.
*2 N-cyclohexyl-2-benzothiazylsulfenamide

TABLE 4

| | | Ex. 1 | Ex. 2 | Ex. 3 | Ex. 4 | Ex. 5 | Ex. 6 | Ex. 7 | Ex. 8 | Comp. Ex. 1 | Comp. Ex. 2 | Comp. Ex. 3 | Comp. Ex. 4 | Comp. Ex. 5 | Comp. Ex. 6 |
|---|---|---|---|---|---|---|---|---|---|---|---|---|---|---|---|
| SBR-A | A-1 | 15 | | | | | | | | 100 | | | | | |
| | A-2 | | 15 | | | | | | | | | | | | |
| | A-3 | | | 15 | | | | | | | | | | | |
| | A-4 | | | | 15 | | | | | | | | | | |
| | A-5 | | | | | 15 | | | | | | | | | |
| | A-6 | | | | | | 15 | 15 | 15 | | | | | | |
| | A-7 | | | | | | | | | | | | | | |
| | A-8 | | | | | | | | | | | | | | |
| | A-9 | | | | | | | | | | | | | | |
| | A-10 | | | | | | | | | | | | | | |
| SBR-B | B-1 | 20 | 20 | 20 | 20 | 20 | 20 | | | | 100 | | | 50 | 50 |
| | B-2 | | | | | | | 20 | 20 | | | | | | |
| | B-3 | | | | | | | | | | | | | | |
| | B-4 | | | | | | | | | | | | | | |
| | B-5 | | | | | | | | | | | | | | |
| BR | C-1 | 15 | 15 | 15 | 15 | 15 | 15 | | | | | 100 | | | 15 |
| | C-2 | | | | | | | 15 | | | | | | | |
| | C-3 | | | | | | | | 15 | | | | | | |
| | C-4 | | | | | | | | | | | | | | |
| natural rubber (RSS#3) | | 50 | 50 | 50 | 50 | 50 | 50 | 50 | 50 | | | | 100 | 50 | 35 |
| press vulcanization time (min) | | 20 | 20 | 20 | 20 | 20 | 20 | 20 | 20 | 30 | 30 | 20 | 10 | 20 | 20 |
| abrasion resistance | | 110 | 118 | 117 | 117 | 114 | 115 | 120 | 121 | 92 | 90 | 220 | 116 | 100 | 119 |
| wet skid resistance | | 101 | 102 | 102 | 102 | 102 | 102 | 101 | 100 | 102 | 106 | 60 | 93 | 100 | 94 |
| rebound resilience | | 50 | 52 | 52 | 52 | 50 | 51 | 55 | 54 | 30 | 45 | 51 | 52 | 49 | 50 |
| tensile strength (kg/cm$^2$) | | 214 | 229 | 219 | 230 | 222 | 215 | 236 | 220 | 212 | 190 | 181 | 249 | 213 | 203 |
| elongation (%) | | 510 | 520 | 500 | 530 | 530 | 500 | 500 | 510 | 500 | 440 | 520 | 550 | 520 | 470 |
| tensile strength at 300% (kg/cm$^2$) | | 111 | 120 | 119 | 118 | 116 | 118 | 125 | 118 | 129 | 118 | 92 | 124 | 110 | 114 |

TABLE 5

| | | Ex. 1 | Comp. Ex. 7 | Comp. Ex. 8 | Comp. Ex. 9 | Comp. Ex. 10 | Comp. Ex. 11 | Comp. Ex. 12 | Comp. Ex. 13 | Comp. Ex. 14 | Comp. Ex. 15 | Comp. Ex. 16 | Comp. Ex. 17 | Comp. Ex. 18 | Comp. Ex. 19 |
|---|---|---|---|---|---|---|---|---|---|---|---|---|---|---|---|
| SBR-A | A-1 | 15 | 25 | 25 | | 25 | 5 | | | | | 15 | 15 | 15 | 15 |
| | A-2 | | | | | | | | | | | | | | |
| | A-3 | | | | | | | | | | | | | | |
| | A-4 | | | | | | | | | | | | | | |
| | A-5 | | | | | | | | | | | | | | |
| | A-6 | | | | | | | | | | | | | | |
| | A-7 | | | | | | | | 15 | | | | | | |
| | A-8 | | | | | | | | | 15 | | | | | |
| | A-9 | | | | | | | | | | 15 | | | | |
| | A-10 | | | | | | | | | | | | | | |
| SBR-B | B-1 | 20 | 25 | | 25 | 50 | 15 | 20 | 20 | 20 | 20 | | | | 20 |
| | B-2 | | | | | | | | | | | | | | |
| | B-3 | | | | | | | | | | | 20 | | | |
| | B-4 | | | | | | | | | | | | 20 | | |
| | B-5 | | | | | | | | | | | | | 20 | |
| BR | C-1 | 15 | | 25 | 25 | | 25 | 5 | 15 | 15 | 15 | 15 | 15 | 15 | 15 |
| | C-2 | | | | | | | | | | | | | | |
| | C-3 | | | | | | | | | | | | | | |
| | C-4 | | | | | | | | | | | | | | 15 |

TABLE 5-continued

| | Ex. 1 | Comp. Ex. 7 | Comp. Ex. 8 | Comp. Ex. 9 | Comp. Ex. 10 | Comp. Ex. 11 | Comp. Ex. 12 | Comp. Ex. 13 | Comp. Ex. 14 | Comp. Ex. 15 | Comp. Ex. 16 | Comp. Ex. 17 | Comp. Ex. 18 | Comp. Ex. 19 |
|---|---|---|---|---|---|---|---|---|---|---|---|---|---|---|
| natural rubber (RSS#3) | 50 | 50 | 50 | 50 | | 75 | 50 | 50 | 50 | 50 | 50 | 50 | 50 | 50 |
| press vulcanization time (min) | 20 | 20 | 20 | 20 | 30 | 20 | 20 | 20 | 20 | 20 | 20 | 20 | 20 | 20 |
| abrasion resistance | 110 | 92 | 135 | 136 | 123 | 109 | 119 | 101 | 108 | 122 | 96 | 94 | 103 | 95 |
| wet skid resistance | 101 | 97 | 86 | 88 | 101 | 94 | 95 | 98 | 99 | 89 | 100 | 99 | 96 | 101 |
| rebound resilience | 50 | 44 | 46 | 50 | 43 | 50 | 41 | 49 | 46 | 39 | 48 | 50 | 50 | 49 |
| tensile strength (kg/cm$^2$) | 214 | 225 | 211 | 217 | 193 | 236 | 222 | 210 | 219 | 211 | 214 | 198 | 208 | 215 |
| elongation (%) | 510 | 510 | 510 | 510 | 470 | 530 | 500 | 490 | 510 | 460 | 500 | 460 | 490 | 490 |
| tensile strength at 300% (kg/cm$^2$) | 111 | 120 | 112 | 115 | 114 | 122 | 119 | 110 | 120 | 130 | 110 | 108 | 112 | 115 |

Thus, as opposed to the conventional technique, the present invention enables the formation of a rubber composition having an excellent balance among the abrasion resistance, wet skid resistance, and rebound resilience at 60° C.

The rubber composition of the present invention is suitable for use as a tire tread and further can be used also for belts, floor materials, rubber vibration isolator, etc.

What is claimed is:

1. A rubber composition for tire tread comprising a rubber mixture composed of the following components (a) to (d):
  (a) 5 to 30% by weight of styrene-butadiene copolymer rubber, designated as SBR-A, having 35 to 60% by weight of bound styrene content and 35 to 60% by mole of vinyl bond in the butadiene unit and having a Mooney viscosity of 20 to 200 and a weight average molecular weight of 100000 to 1000000 wherein said SBR-A is prepared by solution polymerization in the presence of an organic lithium compound;
  (b) 15 to 40% by weight of styrene-butadiene copolymer rubber, designated as SBR-B, having 5 to 20% by weight of bound styrene content and 50 to 90% by mole of vinyl bond in the butadiene unit, and having a Mooney viscosity of 20 to 200 and a weight average molecular weight of 100000 to 1000000 and prepared by solution polymerization in the presence of an organic lithium compound;
  (c) 5 to 30% by weight of polybutadiene rubber, designated as BR, having 20% by mole or less of vinyl bond; and
  (d) 10 to 60% by weight of natural rubber and/or synthetic polyisoprene rubber having 90% by mole or more of cis-1,4 bond.

2. A rubber composition for tire tread according to claim 1, which further comprises at least 20% by weight, based on the total amount of SBR-A, SBR-B, and BR, of a polymer or copolymer prepared by reacting the lithium terminal of a polymer or a copolymer comprising at least one member selected from the group consisting of said SBR-A, said SBR-B, and BR polymerized in the process of an organic lithium compound, with at least one compound selected from the group consisting of compounds having a structure represented by the formula

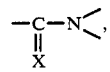

benzopnenones, and thiobenzophenones, wherein X is oxygen or sulfur.

3. A rubber composition for tire tread according to claim 1, which further comprises at least 20% by weight, based on the total amount of SBR-A, SBR-B, and BR, of a polymer or a copolymer prepared by bonding a polymer or a copolymer comprising at least one member selected from the group consisting of said SBR-A, said SBR-B, and BR polymerized in the presence of an organic lithium compound, to at least one metal selected from the group consisting of tin, silicon, lead, and germanium.

4. A rubber composition for tire tread according to claim 2, which further comprises at least 20% by weight, based on the total amount of SBR-A, SBR-B, and BR, of a polymer or a copolymer prepared by bonding a polymer or a copolymer comprising at least one member selected from the group consisting of said SBR-A, said SBR-B, and BR polymerized in the presence of an organic lithium compound, to at least one metal selected from the group consisting of tin, silicon, lead, and germanium.

* * * * *